(12) United States Patent
Yasuda et al.

(10) Patent No.: US 11,241,809 B2
(45) Date of Patent: Feb. 8, 2022

(54) MOLDING DIE AND COMPRESSION MOLDING METHOD

(71) Applicant: Asahi Kasei Kabushiki Kaisha, Tokyo (JP)

(72) Inventors: Kazuharu Yasuda, Tokyo (JP); Yuo Umei, Tokyo (JP); Hideaki Ichiki, Tokyo (JP); Susumu Sugano, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 532 days.

(21) Appl. No.: 16/093,091

(22) PCT Filed: Apr. 13, 2017

(86) PCT No.: PCT/JP2017/015197
§ 371 (c)(1),
(2) Date: Oct. 11, 2018

(87) PCT Pub. No.: WO2017/179675
PCT Pub. Date: Oct. 19, 2017

(65) Prior Publication Data
US 2019/0126521 A1    May 2, 2019

(30) Foreign Application Priority Data

Apr. 15, 2016  (JP) .............................. JP2016-082440
Apr. 15, 2016  (JP) .............................. JP2016-082441

(51) Int. Cl.
*B29C 43/52*  (2006.01)
*B29C 43/36*  (2006.01)
(Continued)

(52) U.S. Cl.
CPC .............. *B29C 43/52* (2013.01); *B29C 33/02* (2013.01); *B29C 33/04* (2013.01); *B29C 43/003* (2013.01);
(Continued)

(58) Field of Classification Search
CPC ....... B29C 43/36; B29C 43/52; B29C 43/003; B29C 33/3828
See application file for complete search history.

(56) References Cited

U.S. PATENT DOCUMENTS 3,734,449 A * 5/1973 Itou ..................... B29C 33/3828
249/114.1
4,395,222 A * 7/1983 Gaiser ................. B29C 45/2725
425/548

(Continued)

FOREIGN PATENT DOCUMENTS

EP     1110692 A1    6/2001
EP     1950020 A1    7/2008
(Continued)

OTHER PUBLICATIONS

Kusner, Robert, A Review of Copper Alloys for Plastic Injection Molding, Retrieved from https://www.moldmakingtechnology.com/articles/a-review-of-copper-alloys-for-plastic-injection-molding-, MoldMaking Technology (Dec. 1, 2011), 2 pages (Year: 2011).*

(Continued)

*Primary Examiner* — Matthew J Daniels
(74) *Attorney, Agent, or Firm* — Morgan, Lewis & Bockius LLP

(57) ABSTRACT

A molding die and a molding method are provided, which allow high-cycle manufacturing of molded bodies of a thermoplastic resin or thermoplastic resin-fiber composite material, thereby improving productivity. Molding is performed using a molding die including a plurality of die (Continued)

portions that form a cavity in which a molded body is molded, the molding die including: a first temperature adjusting unit disposed in the vicinity of the cavity surface and capable of at least cooling the cavity surface; and a second temperature adjusting unit disposed on a side of the first temperature adjusting unit opposite from the cavity surface and capable of at least heating the cavity surface, wherein a distance L0 from the cavity surface to the first temperature adjusting unit and a distance L1 from the cavity surface to a surface of the corresponding die portion opposite from the cavity surface satisfy the relationship: (L1/L0)>3.

8 Claims, 5 Drawing Sheets

(51) Int. Cl.
| | |
|---|---|
| B29C 70/34 | (2006.01) |
| B29C 70/46 | (2006.01) |
| B29C 33/04 | (2006.01) |
| B29C 33/02 | (2006.01) |
| B29C 43/00 | (2006.01) |
| B29K 101/12 | (2006.01) |
| B29C 35/16 | (2006.01) |
| B29C 35/04 | (2006.01) |
| B29C 69/02 | (2006.01) |
| B29K 105/08 | (2006.01) |
| B29C 35/02 | (2006.01) |
| B29C 45/14 | (2006.01) |
| B29C 33/38 | (2006.01) |

(52) U.S. Cl.
CPC .............. *B29C 43/36* (2013.01); *B29C 70/34* (2013.01); *B29C 70/345* (2013.01); *B29C 70/465* (2013.01); *B29C 70/467* (2013.01); B29C 33/048 (2013.01); B29C 33/3828 (2013.01); B29C 35/049 (2013.01); B29C 45/14786 (2013.01); B29C 69/02 (2013.01); B29C 2033/023 (2013.01); B29C 2035/0211 (2013.01); B29C 2035/043 (2013.01); B29C 2035/165 (2013.01); B29C 2035/1616 (2013.01); B29K 2101/12 (2013.01); B29K 2105/08 (2013.01); B29K 2105/0809 (2013.01); B29K 2995/0041 (2013.01)

(56) References Cited

U.S. PATENT DOCUMENTS

| | | | | |
|---|---|---|---|---|
| 5,064,597 | A | * | 11/1991 | Kim ..................... B29C 33/56 264/219 |
| 5,176,839 | A | * | 1/1993 | Kim ..................... B29C 33/02 249/78 |
| 5,775,402 | A | * | 7/1998 | Sachs ..................... B22F 5/007 164/4.1 |
| 5,824,237 | A | * | 10/1998 | Stumpf .................. B29C 33/02 249/80 |
| 7,118,372 | B2 | | 10/2006 | Eichlseder |
| 7,445,743 | B2 | | 11/2008 | Eichlseder |
| 9,116,264 | B2 | | 8/2015 | Makuta et al. |
| 10,022,897 | B2 | | 7/2018 | Makuta et al. |
| 2003/0175520 | A1 | | 9/2003 | Grutta et al. |
| 2003/0215540 | A1 | | 11/2003 | Asai |
| 2005/0064061 | A1 | * | 3/2005 | Eichlseder ............. B29C 33/04 425/548 |
| 2008/0054529 | A1 | | 3/2008 | Kang |
| 2009/0212464 | A1 | | 8/2009 | Kang |
| 2010/0086727 | A1 | | 4/2010 | Katayama et al. |
| 2010/0221373 | A1 | * | 9/2010 | Chen .................. B29C 33/3828 425/3 |
| 2016/0303786 | A1 | * | 10/2016 | He ..................... B29C 33/3828 |

FOREIGN PATENT DOCUMENTS

| | | |
|---|---|---|
| JP | 2007-301723 A | 11/2007 |
| JP | 2009-113369 A | 5/2009 |
| JP | 4334469 B2 | 9/2009 |
| JP | 2013-154624 A | 8/2013 |
| JP | 2013-154625 A | 8/2013 |
| JP | 2013-203020 A | 10/2013 |
| JP | 2014-226851 A | 12/2014 |
| JP | 2015-101794 A | 6/2015 |
| KR | 10-2006-0102587 A | 9/2006 |
| TW | 201417984 A | 5/2014 |
| TW | 201417989 A | 5/2014 |
| WO | 2011/132996 A2 | 10/2011 |

OTHER PUBLICATIONS

Wang, G., G. Zhao, H. Li, Y. Guan, Research on optimization design of the heating/cooling channels for rapid heat cycle molding based on response surface methodology and constrained particle swarm optimization, Expert Systems with Applications, vol. 38 (2011), pp. 6705-6719. (Year: 2011).*
Supplementary European Search Report issued in corresponding European Patent Application No. 17782488.5.
Supplemental European Search Report issued in corresponding European Patent Application No. 17782488.5 dated Mar. 8, 2019.
International Search Report and Written Opinion issued in corresponding International Patent Application No. PCT/JP2017/015197.

* cited by examiner

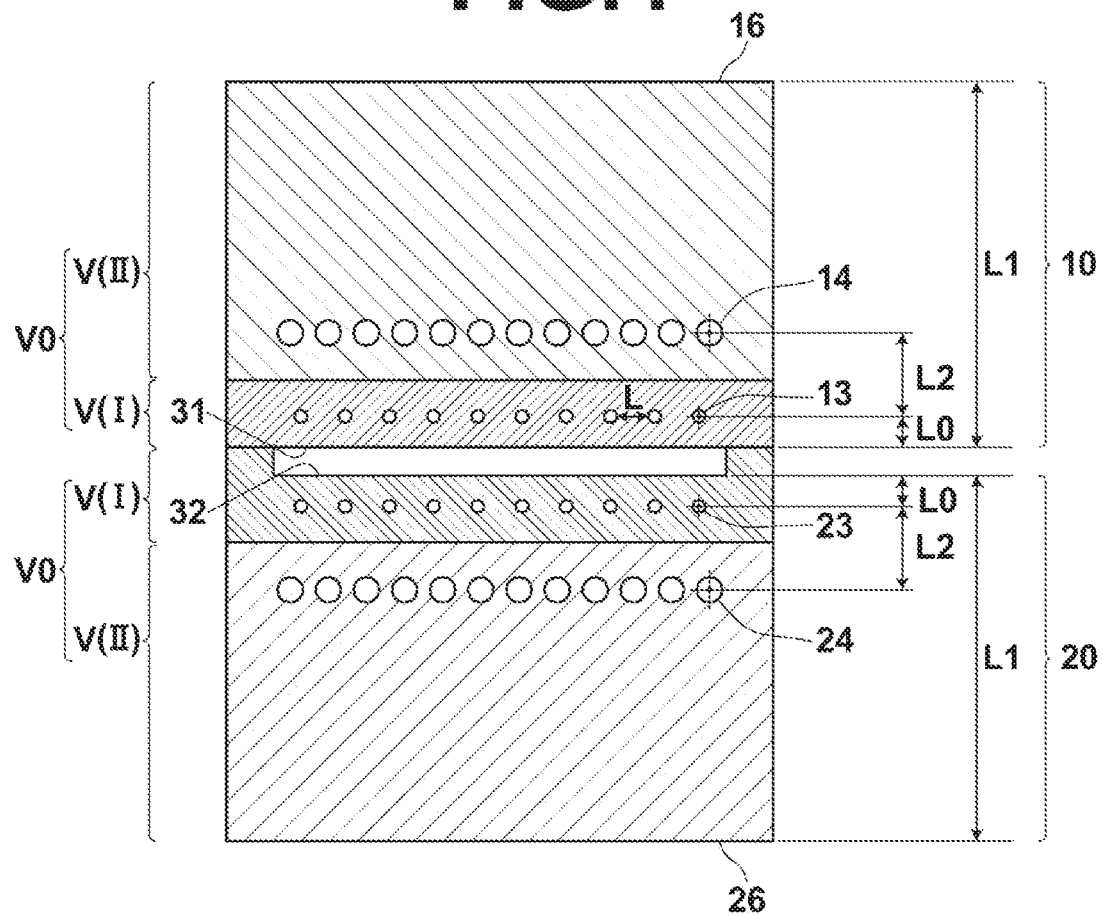
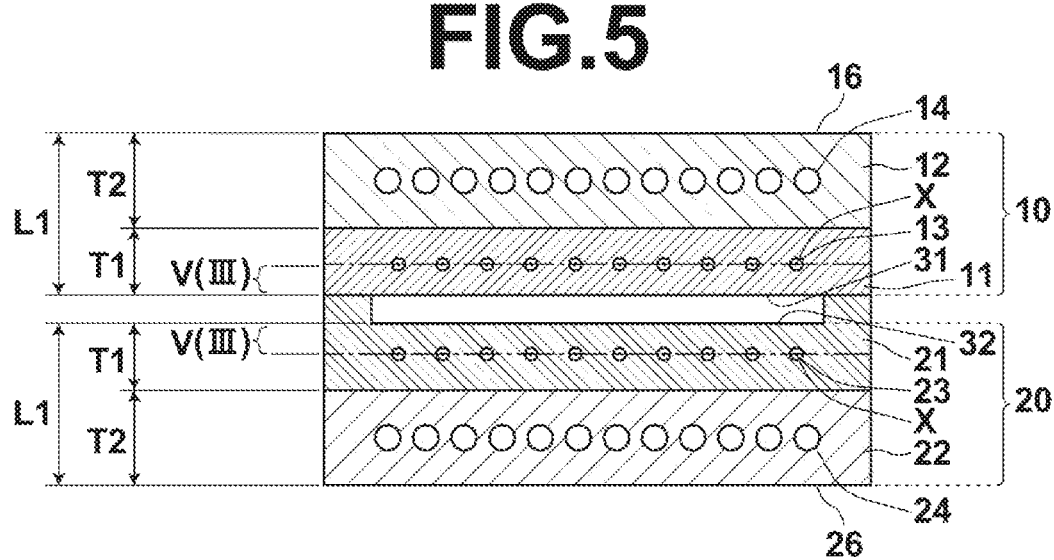

MOLDING DIE AND COMPRESSION MOLDING METHOD

CROSS-REFERENCE TO RELATED APPLICATIONS

This application is a National Phase Entry of PCT International Application No. PCT/JP2017/015197 filed on Apr. 13, 2017, which claims priority under 35 U.S.C. § 119(a) to Japanese Patent Application No. 2016-082440 filed on Apr. 15, 2016 and Japanese Patent Application No. 2016-082441 filed on Apr. 15, 2016. Each of the above applications is hereby expressly incorporated by reference, in its entirety, into the present application.

TECHNICAL FIELD

The present disclosure relates to a molding die and a compression molding method for compression molding composite molded bodies of a thermoplastic resin-fiber composite material.

BACKGROUND ART

In recent years, as a material to form composite material molded bodies for use as structural parts of various machines and automobiles, pressure vessels, and tubular structures, etc., a composite yarn, which is a continuous and uniform mixture of strengthening fibers and thermoplastic resin fibers, and a fabric cloth made of the composite yarn are proposed. A molding method for providing molded bodies using such a fabric cloth is proposed, for example, in Japanese Unexamined Patent Publication No. 2015-101794 (hereinafter, Patent Document 1), wherein the fabric cloth is placed in a die heated to 280° C. to melt the thermoplastic resin moiety of the fabric cloth, and then the die is cooled to 50° C. for solidification.

Further, each of Japanese Patent No. 4334469 and Japanese Unexamined Patent Publication No. 2014-226851 (hereinafter, Patent Documents 2 and 3, respectively) proposes a technique, wherein a die that is used to perform injection molding of a thermoplastic resin material is provided with cooling paths and heating paths to heat and cool the die.

Still further, Japanese Unexamined Patent Publication No. 2013-203020 (hereinafter, Patent Document 4) proposes a method for press molding a composite material using a die that is provided with a cooling mechanism disposed on the cavity surface side, and a heating mechanism disposed behind the cooling mechanism.

SUMMARY

In order to provide good appearance and good strength of such a fabric cloth, it is necessary to perform molding with sufficient impregnation of the thermoplastic resin in between the mesh of the fabric cloth. To achieve this, conventional molding of the fabric cloth made of the composite yarn requires, first, a step of making a plate-like fabric cloth by melting the thermoplastic resin of the fabric cloth, and then, a step of inserting the plate-like fabric cloth into a preheated die, increasing the temperature of the die to a certain temperature with infrared ray, or the like, and compressing the fabric cloth for several minutes. However, in the case where the plate-like fabric cloth is compression molded using a die having a shape with a large protrusion and/or depression, the strengthening fibers in the composite yarn may be broken along corner lines between the protruded portion and the depressed portion of the shape, which degrades the appearance or strength at that portion.

On the other hand, in order to improve productivity, it may be considered to insert the fabric cloth in the form of fabric into a die without making a plate-like fabric cloth, and perform heating and cooling with a large temperature difference in a short time. However, the techniques described in the above-mentioned Patent Documents have limitations in achieving a heating rate, a cooling rate, and a difference between a heating temperature and a cooling temperature that are necessary to rapidly heat and rapidly cool the die. Further, none of the above-mentioned Patent Documents disclose anything about a method for achieving high-cycle heating and cooling with a large temperature difference of the composite material.

In view of the above-described circumstances, the present disclosure is directed to providing a molding die and a compression molding method that allow high-cycle manufacturing of molded bodies of a composite material (a thermoplastic resin-fiber composite material, which may hereinafter simply be referred to as "composite material") containing a thermoplastic resin and strengthening fibers.

The present inventors have found through intensive study that using a die having a certain structure allows high-cycle manufacturing of molded bodies of a composite material containing a thermoplastic resin, or a combination of a thermoplastic resin and strengthening fibers, thereby achieving the present disclosure.

Namely, the present disclosure is as follows.

A molding die comprising a plurality of die portions that form a cavity in which a molded body is molded, the molding die comprises:

first temperature adjusting means disposed in the vicinity of a cavity surface, the first temperature adjusting means being capable of at least cooling the cavity surface; and second temperature adjusting means disposed on a side of the first temperature adjusting means opposite from the cavity surface, the second temperature adjusting means being capable of at least heating the cavity surface, wherein a distance $L0$ from the cavity surface to the first temperature adjusting means and a distance $L1$ from the cavity surface to a surface of the corresponding die portion opposite from the cavity surface satisfy the following relationship:

$$(L1/L0) > 3.$$

It is preferred that a distance $L2$ from the first temperature adjusting means to the second temperature adjusting means satisfy the following relationship:

$$L2 > L0.$$

It is preferred that each die portion comprise a first section including the first temperature adjusting means, and a second section including the second temperature adjusting means.

It is preferred that a volume $V(I)$ of the first section of the die portion and a volume $V0$ of the die portion satisfy the following relationship:

$$(V0/V(I)) > 1.3.$$

It is preferred that the volume $V(I)$ of the first section and the volume $V0$ of the die portion satisfy the following relationship:

$$(V0/V(I)) < 3.$$

It is preferred that a material forming the first section have a thermal conductivity C(I) (J/s·m·K) that is 3.5 times or more a thermal conductivity C(II) (J/s·m·K) of a material forming the second section, and/or the material forming the first section have a thermal diffusivity (m²/s) that is 3.5 times or more a thermal diffusivity (m²/s) of the material forming the second section.

It is preferred that a material forming the first section have a thermal conductivity C(I) (J/s·m·K) of 100 J/s·m·K or more.

It is preferred that a material forming the first section have a hardness HB of 200 or more.

The hardness HB (Brinell hardness) is a value that is found according to ISO 6506.

It is preferred that the material forming the first section have a hardness HB of 250 or more.

It is preferred that the first section and the second section be able to be spaced apart from each other when cooling of the cavity surface is performed.

It is preferred that the first temperature adjusting means comprise a plurality of cooling medium paths through which a cooling medium flows, and at least one manifold configured to let the cooling medium at the same temperature simultaneously flow through the plurality of cooling medium paths.

The molding die of the disclosure may comprise a depressurization path configured to reduce pressure in the cavity when the die is fastened.

Furthermore, the present inventors have found through intensive study that performing compression molding with a certain temperature increase rate, a certain temperature decrease rate, and a certain temperature difference allows high-cycle manufacturing of molded bodies using the composite material, thereby achieving the disclosure.

Namely, the present disclosure is as follows.

The compression molding method of the present disclosure is a compression molding method for obtaining a composite molded body by compression molding a thermoplastic resin-fiber composite material consisting of strengthening fibers and a thermoplastic resin using a die comprising a plurality of die portions that form a cavity, the method comprising:

a first step of inserting the thermoplastic resin-fiber composite material into the cavity of the die, fastening the die, and increasing the temperature of a cavity surface to a heating temperature that is equal to or higher than a melting point or glass transition temperature of the thermoplastic resin to melt the thermoplastic resin; and after the first step, a second step of decreasing the temperature of the cavity surface to a cooling temperature that is lower than the melting point or glass transition temperature of the thermoplastic resin while the die is still fastened to cool and solidify the thermoplastic resin, and then opening the die to remove the composite molded body from the die, wherein a temperature increase rate during the first step is 30° C./minute or more, a temperature decrease rate during the second step is 30° C./minute or more, and a difference between the heating temperature and the cooling temperature is 80° C. or more.

It is preferred that the temperature of the cavity surface when the thermoplastic resin-fiber composite material is inserted into the cavity be maintained at the cooling temperature that is lower than the melting point or glass transition temperature of the thermoplastic resin forming the thermoplastic resin-fiber composite material.

It is more preferred that the temperature increase rate be 80° C./minute or more, the temperature decrease rate be 100° C./minute or more, and a difference between the heating temperature and the cooling temperature be 100° C. or more.

It is preferred that the temperature increase rate be 150° C./minute or more, the temperature decrease rate be 200° C./minute or more, and a difference between the heating temperature and the cooling temperature be 120° C. or more.

It is preferred that the thermoplastic resin-fiber composite material consist of the strengthening fibers and thermoplastic resin fibers.

It is preferred that the strengthening fibers be at least one selected from the group consisting of glass fibers, carbon fibers, aramid fibers, superstrong polyethylene fibers, polybenzazole fibers, liquid crystal polyester fibers, polyketone fibers, metallic fibers, and ceramic fibers.

It is preferred that the thermoplastic resin-fiber composite material be in the form of a fabric cloth.

It is preferred that the thermoplastic resin be a crystalline resin, and be at least one selected from the group consisting of polyolefin resin, polyamide resin, polyester resin, polyether ketone, polyether ether ketone, polyether sulfone, polyphenylene sulfide, and thermoplastic polyether imide.

It is preferred that the die portion comprise a first section including first temperature adjusting means that is capable of at least cooling the cavity surface, and a second section including second temperature adjusting means that is capable of at least heating the cavity surface.

It is preferred that the first temperature adjusting means comprise a plurality of cooling medium paths through which a cooling medium flows, and at least one manifold configured to let the cooling medium at the same temperature simultaneously flow through the plurality of cooling medium paths, and a cooling efficiency, which is represented by a ratio (A/V(III)) between a flow rate A {L (cm³)/minute} of the cooling medium during cooling and a volume V(III) (cm³) of a portion of the first section located between the cavity surface of the die and a plane formed by connecting the central axes of the plurality of cooling medium paths, be 15/minute or more.

It is preferred that a heat density during heating of the die portion, which is represented by total heating capacity (kW) of the second section/weight (kg) of the first section, be 0.6 kW/kg or more.

It is preferred that a material forming the first section have a thermal conductivity C(I) (J/s·m·K) that is 3.5 times or more a thermal conductivity C(II) (J/s·m·K) of a material forming the second section, and/or the material forming the first section have a thermal diffusivity (m²/s) that is 3.5 times or more a thermal diffusivity (m²/s) of a material forming the second section.

It is preferred that the first section and the second section be able to be spaced apart from each other when cooling of the cavity surface is performed.

The molding die of present the disclosure allows highly productive high-cycle manufacturing of molded bodies of a thermoplastic resin-fiber composite material.

Also, the compression molding method of the disclosure allows highly productive high-cycle manufacturing of molded bodies of a thermoplastic resin-fiber composite material.

BRIEF DESCRIPTION OF THE DRAWINGS

FIG. 4 is a schematic sectional view for explaining details of the one embodiment of the die for use in the compression molding method of the disclosure, FIG. 5 is a schematic sectional view for explaining details of a first section.

DESCRIPTION OF EMBODIMENTS

Now, embodiments of the present disclosure will be described in detail. The embodiments described below are not intended to limit the disclosure, and various modifications can be made to the disclosure within the spirit and scope of the disclosure.

Compression Molding Method

A compression molding method of the disclosure achieves high-cycle molding of composite molded bodies of a thermoplastic resin-fiber composite material, wherein the surface of a cavity of a die for molding the molded bodies is rapidly heated to a high temperature that is equal to or higher than the melting point or glass transition temperature of the thermoplastic resin, and then rapidly cooled to a temperature that is lower than the melting point or glass transition temperature of the thermoplastic resin to quickly achieve heating and melting, and cooling and solidification of the thermoplastic resin in the cavity.

Figure 1:
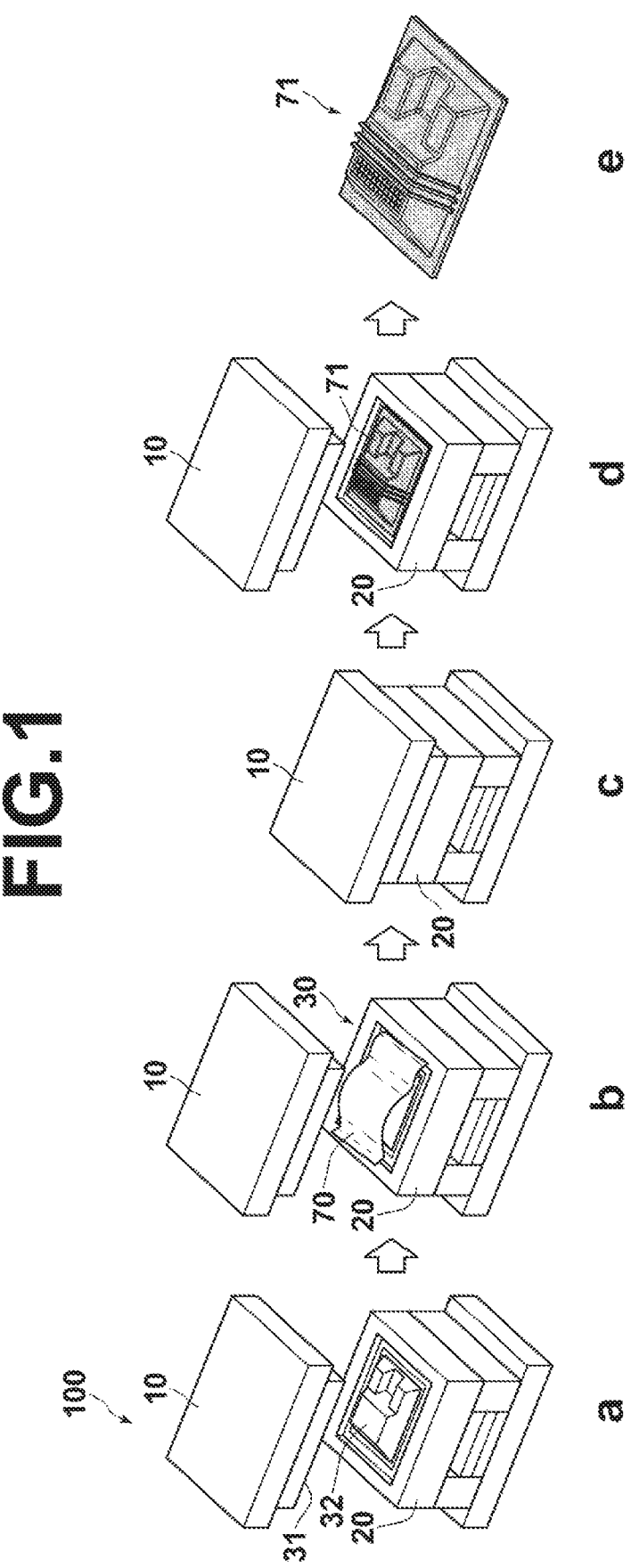
FIG. 1 is a schematic view illustrating a compression molding method of the present disclosure.

One embodiment of the compression molding method of the disclosure is described. FIG. 1 shows a schematic view illustrating the compression molding method.

First, as shown at "a" in FIG. 1, a die 100 comprised of die portions 10, 20 is opened while surfaces 31, 32 of the cavity (hereinafter referred to as "cavity surfaces") of the die 100 are maintained at a temperature that is lower than the melting point or glass transition temperature of a thermoplastic resin forming a composite material (fabric cloth), from which a molded body is molded.

Subsequently, as shown at "b" in FIG. 1, a fabric cloth 70a of the composite material, which is a fabric base material, is cut into a desired shape and inserted into the cavity 30.

Then, as shown at "c" in FIG. 1, the die 100 is closed (fastened) and the temperature of the cavity surfaces is increased. The temperature of the cavity surfaces of the die is set to be equal to or higher than the melting point or equal to or higher than the glass transition temperature of the thermoplastic resin forming the composite material, and is controlled to be always constant by second temperature adjusting means 14, 24. The heated cavity surfaces quickly melt the thermoplastic resin moiety of the fabric cloth set in the cavity (a first step). The number of sheets of the fabric cloth 70 inserted into the cavity 30 is adjusted depending on a desired thickness of the resulting molded body.

After the die is closed, the pressure in the cavity 30 may be reduced, as necessary, to discharge air in the die and air present in the fabric cloth of the base material, thereby allowing the melt thermoplastic resin to quickly impregnate the strengthening fibers. This depressurization can be achieved, for example, by providing the cavity surfaces with a slit portion of not more than 1/10 mm to let air escape from the cavity surfaces, and providing an air intake line to draw air out from the cavity or providing a vacuum line utilizing degassing equipment provided at ejector pins to effect vacuuming of the cavity surfaces without letting the resin escape from the cavity 30. Further, as necessary, it is desirable to provide packings at predetermined positions of the cavity surfaces of the die and the ejector pins so as to provide an air-tight structure for preventing external air from flowing into the cavity during vacuuming.

Subsequently, while the die is still fastened, the cavity surfaces 31, 32 of the die 100 are cooled to a cooling temperature that is lower than the melting point or glass transition temperature of the thermoplastic resin to cool and solidify the thermoplastic resin.

Then, as shown at "d" and "e" in FIG. 1, the die 100 is opened and a molded body 71 is removed from the die (a second step).

The temperature increase rate in the first step is 30° C./minute or more, the temperature decrease rate in the second step is 30° C./minute or more, and a difference between the heating temperature and the cooling temperature is 80° C. or more. It is preferred that the temperature increase rate be 80° C./minute or more, the temperature decrease rate be 100° C./minute or more, and a difference between the heating temperature and the cooling temperature be 100° C. or more, and it is more preferred that the temperature increase rate be 150° C./minute or more, the temperature decrease rate be 200° C./minute or more, and a difference between the heating temperature and the cooling temperature be 120° C. or more.

The temperature increase rate is preferably 30° C./minute or more in view of productivity, and the temperature decrease rate is preferably 30° C./minute or more in view of productivity. The temperature difference is preferably 80° C. or more in view of impregnation of the resin into the continuous strengthening fibers, and solidification and releasability of the molded body when it is removed from the die. Higher temperatures allow better impregnation, and lower temperatures allow better solidification and releasability.

After the molded body is removed from the die, another fabric cloth of the composite material serving as the fabric base material cut into a desired shape is inserted into the cavity, and the die is closed.

Then, the first step and the second step are repeated to produce another molded body, and so forth.

Simultaneously with removal of the molded body from the die, or after the molded body is removed from the die, the temperature of the cavity surfaces of the die can be increased, for example, by flowing high-pressure superheated steam or low-pressure superheated steam through the cooling medium paths of the die.

Further, superheated steam at 300° C. or more may be flown over the cavity surfaces to heat the cavity surfaces before the fabric cloth is inserted.

Furthermore, after the fabric cloth is inserted into the cavity, superheated steam at 300° C. or more can be introduced via the vacuum line into the cavity to directly heat the base material. The superheated steam introduced into the die can be discharged via the vacuum line after a desired time from the introduction.

According to the disclosure, the cavity surfaces are rapidly heated to a temperature that is equal to or higher than the melting point or glass transition temperature of the thermoplastic resin forming the thermoplastic resin-fiber composite material to melt the thermoplastic resin, and then, while the die is still fastened, the cavity surfaces are rapidly cooled to a temperature that is lower than the melting point or glass transition temperature of the thermoplastic resin to cool and solidify the thermoplastic resin. This allows high-cycle and economically efficient manufacturing of molded bodies of the thermoplastic resin-fiber composite material.

Hybrid Molding

Figure 2:
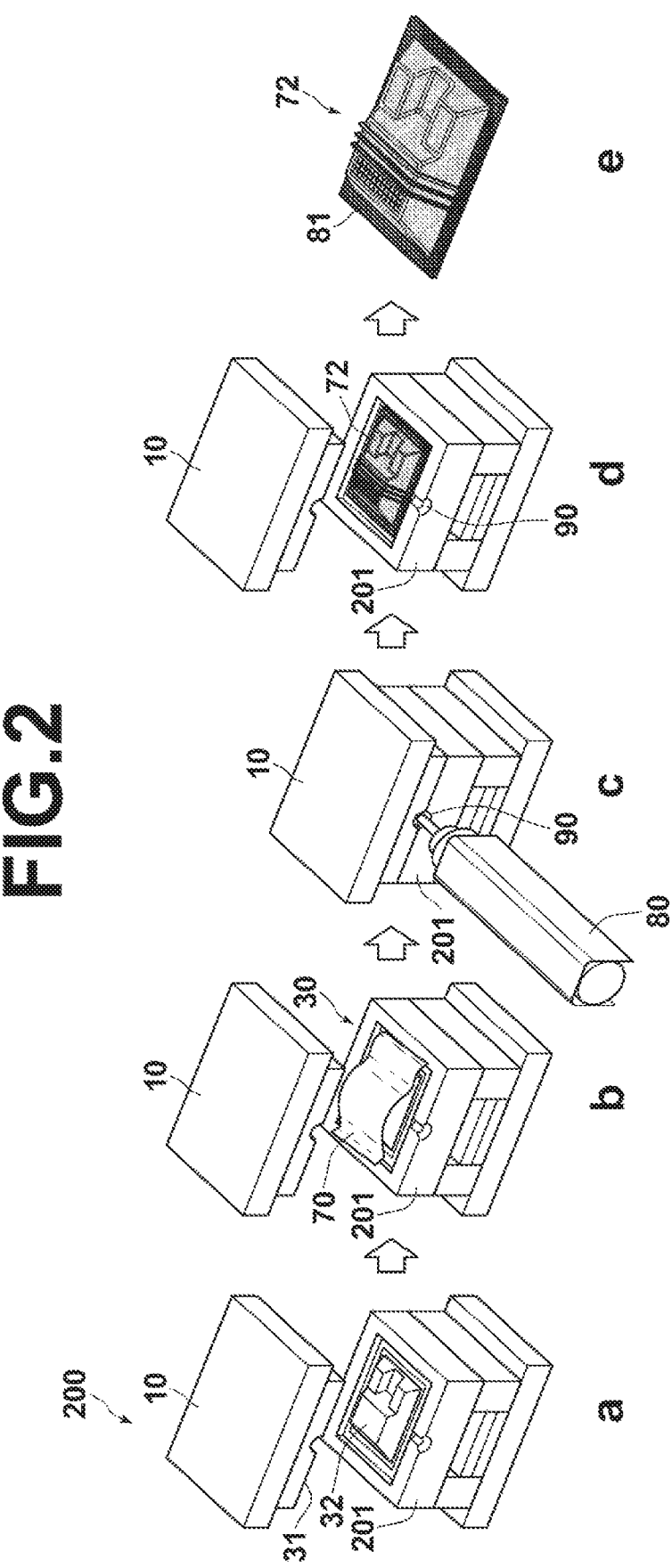
FIG. 2 is a schematic view illustrating a hybrid molding method combining the compression molding method of the disclosure with injection molding.

The compression molding method of the disclosure can be combined with an injection molding step to be used as a hybrid molding method. FIG. 2 shows a schematic view illustrating the hybrid molding. Elements shown in FIG. 2 that are identical with those shown in FIG. 1 are designated by the same reference symbols and descriptions thereof are omitted.

As shown at "a" and "b" in FIG. 2, the fabric cloth 70 is inserted in the same procedure as in the compression molding method.

As shown at "c" in FIG. 2, a die portion 201 of a die 200 for hybrid molding is provided with a runner portion 90 for charging the thermoplastic resin from an injection molder 80. The runner portion 90 is provided using a known method.

After the thermoplastic resin is charged, the die is opened as shown at "d" in FIG. 2, and then, a hybrid molded body 72 made of the fabric cloth 70 and the thermoplastic resin 81 is removed from the die as shown at "e" in FIG. 2.

Molding Die

Figure 3:
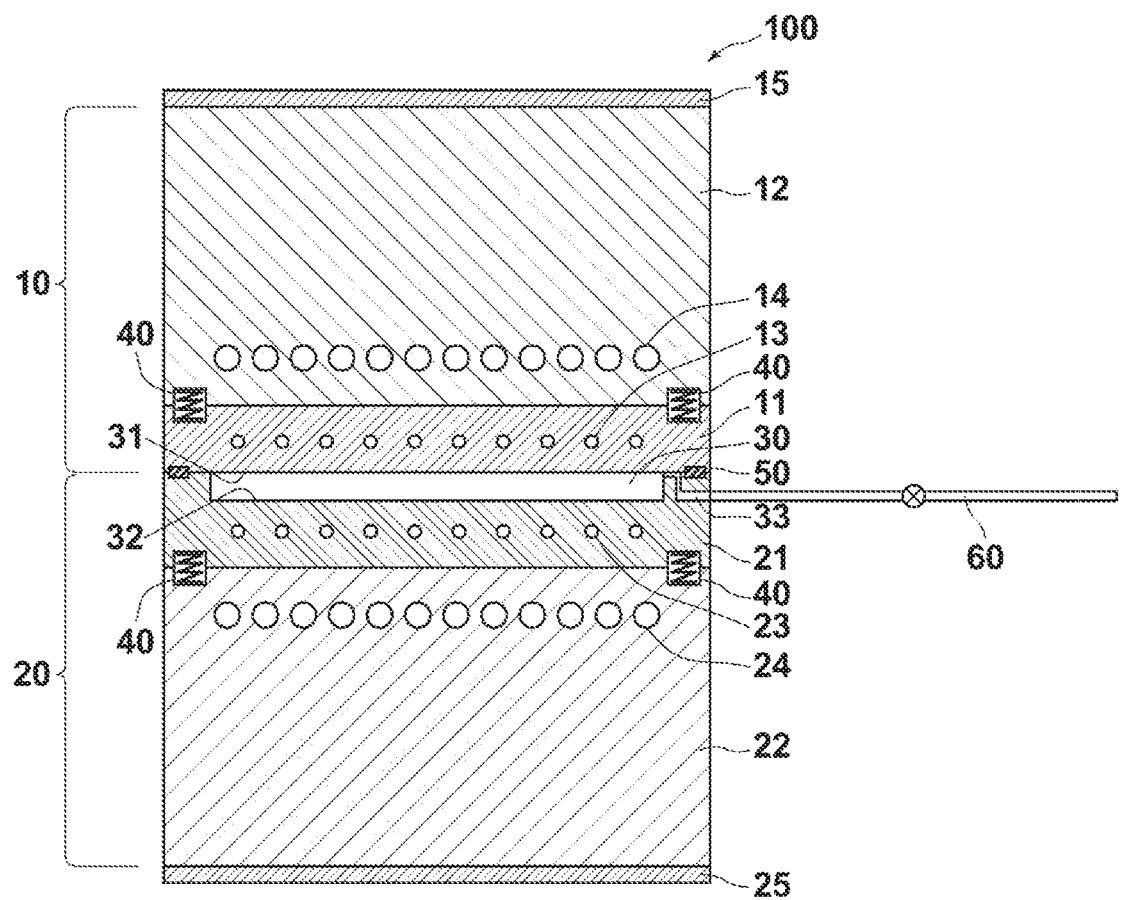
FIG. 3 is a schematic sectional view of one embodiment of a die for use in the compression molding method of the disclosure.

Next, the molding die of the disclosure, which can be used with the compression molding method of the disclosure, is described with reference to the drawings. The molding die of the disclosure is not limited to one described below. FIG. 3 shows a schematic sectional view of one embodiment of the die.

As shown in FIG. 3, the die 100 includes a die portion 10 serving as an upper die, a die portion 20 serving as a lower die, and heat insulation panels 15, 25, wherein the die portion 10 and the die portion 20 form a cavity 30. The composite material, or the like, is placed in the cavity 30 to form a molded body.

The die portion 10 includes: a first temperature adjusting means 13 that includes a plurality of cooling medium paths disposed in the vicinity of the cavity surface 31 and is capable of at least cooling the cavity surface 31; and a second temperature adjusting means 14 that includes a plurality of rod-shaped cartridge heaters disposed on the side of the first temperature adjusting means 13 opposite from the cavity surface 31 and is capable of at least heating the cavity surface 31.

Similarly, the die portion 20 includes: a first temperature adjusting means 23 that includes a plurality of cooling medium paths disposed in the vicinity of the cavity surface 32 and is capable of at least cooling the cavity surface 32; and a second temperature adjusting means 24 that includes a plurality of rod-shaped cartridge heaters disposed on the side of the first temperature adjusting means 23 opposite from the cavity surface 32 and is capable of at least heating the cavity surface 32.

The die portion 10 has a structure that is divided into a first section 11 including the first temperature adjusting means 13 and a second section 12 including the second temperature adjusting means 14, where the first section 11 and the second section 12 are configured to be able to be spaced apart from each other with springs 40.

Similarly, the die portion 20 has a structure that is divided into a first section 21 including the first temperature adjusting means 23 and a second section 22 including the second temperature adjusting means 24, where the first section 21 and the second section 22 are configured to be able to be spaced apart from each other with springs 40.

The die portion 20 is provided with a depressurization path 33 for reducing the pressure in the cavity 30 when the die is fastened. The depressurization path 33 is coupled via a vacuum line 60 to a depressurization means (not shown) that is disposed externally to the molding die. A sealing packing 50 is provided between the die portion 10 and the die portion 20.

Next, details of the die portions are further described using FIG. 4. FIG. 4 is a schematic sectional view for explaining details of the die, where some of the elements are omitted.

As shown in FIG. 4, the die portions 10 is configured such that a distance $L0$ from the cavity surface 31 to the first temperature adjusting means 13 and a distance $L1$ from the cavity surface 31 to a surface 16 opposite from the cavity surface 31 satisfy the following relationship:

$$(L1/L0) > 3.$$

Similarly, the die portion 20 is configured such that a distance $L0$ from the cavity surface 32 to the first temperature adjusting means 23 and a distance $L1$ from the cavity surface 32 to a surface 26 opposite from the cavity surface 32 satisfy the above relationship.

In the case where the molding die is comprised of a plurality of die portions, at least one of the die portions needs to satisfy the above numerical range, and it is more preferred that all the die portions satisfy the above numerical range.

The distance $L0$ from the cavity surface to the first temperature adjusting means refers to a distance from the cavity surface to the center of the first temperature adjusting means along a cross section perpendicular to the cavity surface of the die.

The distance $L2$ from the first temperature adjusting means to the second temperature adjusting means refers to a distance from the center of the first temperature adjusting means to the center of the second temperature adjusting means along a cross section perpendicular to the cavity surface of the die.

The distance $L1$ from the cavity surface to the surface opposite from the cavity surface refers to a distance along a cross section perpendicular to the cavity surface of the die, and means the thickness of the die portion.

In the case where the cavity surfaces include depressions and protrusions and the distance from each cavity surface to the corresponding first temperature adjusting means varies depending on the position on the surface, the distance $L0$ from the cavity surface to the center of first temperature adjusting means refers to the shortest distance among the different distances $L0$.

Further, in the case where the cavity surfaces include depressions and protrusions and the first temperature adjusting means is disposed at positions along the depressions and protrusions such that the distances from the cavity surface are the same, the distance $L2$ from the first temperature adjusting means to the second temperature adjusting means varies depending on the position. In this case, the distance $L2$ from the first temperature adjusting means to the second temperature adjusting means refers to the shortest distance among the different distances $L2$.

Still further, in the case where the cavity surfaces include depressions and protrusions, the distance $L1$ from the cavity surface to the surface opposite from the cavity surface refers to an average distance of the different distances $L1$.

In the case where the first temperature adjusting means and the second temperature adjusting means include the plurality of cooling medium paths or the plurality of heaters, and the distance from the cavity surface to each path or heater varies depending on the position, the distance refers to an average value of the shortest distances for all the paths or heaters.

In the case where the first section and the second section are made of the same material and integrally formed, the boundary between the first section and the second section is at a distance equal to the distance $L0$ from the center of the first temperature adjusting means toward the second temperature adjusting means along a cross section perpendicular to the cavity surface.

With the molding die of the disclosure, the cavity surface for forming a molded body is heated to a high temperature that is equal to or higher than the melting point of the thermoplastic resin if the thermoplastic resin is a crystalline resin, or equal to or higher than the glass transition temperature of the thermoplastic resin if the thermoplastic resin is a non-crystalline resin, and quickly cooled to a temperature equal to or lower than the solidifying temperature of the thermoplastic resin, thereby allowing quickly heating and melting the thermoplastic resin and quickly cooling and solidifying the thermoplastic resin at high cycle in the cavity.

The die of this embodiment includes the first temperature adjusting means that is disposed in the vicinity of the cavity surface and performs at least cooling, and the second temperature adjusting means that is disposed farther from the cavity surface than the first temperature adjusting means and performs at least heating. The second temperature adjusting means heats the cavity surface by heating the entire die portion.

It is preferred that the first temperature adjusting means is disposed as close as possible to the cavity surface; however, it is necessary to ensure a certain distance between the first temperature adjusting means and the cavity surface in view of strength of the die and design constraints. The distance $L0$ from the cavity surface to the first temperature adjusting means is preferably 30 mm or less, more preferably 20 mm or less, and even more preferably 10 mm or less, although it depends on dimensions of the first temperature adjusting means. The lower limit for the distance $L0$ is not particularly limited; however the distance from the end of the first temperature adjusting means to the cavity surface of the die is preferably 3 mm or more, and more preferably 6 mm or more in view of constraints about strength of the die, although it depends on dimensions of the first temperature adjusting means.

According to the die of this embodiment, the distance $L0$ from the cavity surface to the first temperature adjusting means and the distance $L1$ from the cavity surface to the surface opposite from the cavity surface satisfy the relationship $(L1/L0)>3$, more preferably $(L1/L0)>5$, and most preferably $(L1/L0)>10$.

The upper limit is not particularly limited; however it is preferred to appropriately select the distances to prevent excessive heat discharge to the atmosphere and size increase of the equipment.

Satisfying the relationship $(L1/L0)>3$ to increase the capacity of the heat storage area, which is at higher temperatures than the cooled area, allows achieving rapid heating during heating of the die in an efficient manner. Further, a shorter distance between the first temperature adjusting means for cooling and the cavity surface allows more quickly cooling the molded body during cooling. Furthermore, a smaller cooled area allows more quickly heating the die during heating of the die.

The cooled area herein refers to an area cooled by the first temperature adjusting means, and refers at least to the first section. The heat storage area herein refers to an area heated by the second temperature adjusting means, and refers at least to the second section.

The distance $L2$ from the first temperature adjusting means to the second temperature adjusting means satisfies the relationship $L2>L0$, and preferably satisfies the relationship $2<L2/L0<10$.

Satisfying the relationship $L2>L0$ allows successfully preventing the second temperature adjusting means from being cooled during cooling, and also preventing fluctuation of control power of the second temperature adjusting means during heating.

In view of control of the temperature of the cavity surface, it is preferred that the distance $L0$ and the distance $L2$ be as close as possible if increase and decrease of the temperature of the cavity are small. However, to mold the composite material, the difference between the upper limit and the lower limit for the temperature of the cavity of the die is as large as, for example, 50° C. or more, preferably 100° C. or more, and more preferably 150° C. or more, and therefore satisfying the above defined range is preferred.

The die portion may include the first section including the first temperature adjusting means and the second section including the second temperature adjusting means. In this case, the first section and the second section may be made of the same material; however, it is more preferred that the first section be made of a material having higher thermal conductivity than a material of the second section. The first section made of a material having higher thermal conductivity allows rapidly cooling the first section during cooling, and also allows, when cooling by the first temperature adjusting means in the first section is stopped to perform heating, quickly conducting heat stored in the second section including the second temperature adjusting means.

Examples of the materials forming the first section and the second section include Corson alloy, carbon steel, and stainless steel.

Further, in the case where the first section including the cooling medium paths serving as the first temperature adjusting means and the second section including the second temperature adjusting means are provided, as shown in FIG. 4, it is preferred that a volume $V(I)$ of the first section and a volume $V0$ of the die portion that is substantially heated satisfy the relationship $(V0/V(I))>1.3$, and also the relationship $(V0/V(I))<3$. Since a smaller volume $V(I)$ is preferred in view of achieving rapid heating and rapid cooling of the first section, and a larger volume $V(II)$ of the second section is preferred in view of storing heat, satisfying the relationship $(V0/V(I))>1.3$ is preferred. On the other hand, there is a limitation in reducing the volume $V(I)$ in view of strength of the die and shape constraints of the cavity surface. If the volume $V(II)$ of the second section is excessively large, initial heating takes a long time, or discharged heat from the die increases, and therefore there is a limit on the volume $V(II)$. Further, the reduction of the volume $V(I)$ is limited by constraints about the strength and the shape of the cavity. Accordingly, satisfying the relationship $(V0/V(I))<3$ is preferred.

That is, the cavity surface can be rapidly heated by the heat supplied from the second section, which serves as the heat storage area storing a certain amount of heat, to heat and melt the thermoplastic resin in the material placed in the cavity. A lager capacity of the heat storage area allows more effective heating of the cavity surface. However, the capacity of the heat storage area can be determined as appropriate in view of energy consumption by the heating, depending on the size of the die and the molding equipment.

On the other hand, in the case where the first temperature adjusting means includes the plurality of cooling medium paths, the cavity surface can be rapidly cooled, for example, by flowing a cooling medium through the cooling medium paths in the vicinity of the cavity surface to cool and solidify the melt thermoplastic resin. At this time, in order to cool only an area in the vicinity of the cavity surface, a smaller capacity of the area of the die including the cooling medium paths is preferred, and a smaller distance between the cavity surface and the cooling medium paths is preferred.

The first section and the second section may be made of the same material, or different materials having different thermal conductivities. The volume V(I) of the first section, the thermal conductivity C(I) (J/s·m·K) of the material of the first section, the volume V(II) of the second section, and the thermal conductivity C(II) (J/s·m·K) of the material of the second section preferably satisfy the following relationship:

$$\{V(II) \times (1/C(II))\}/\{V(I) \times (1/C(I))\} > 3,$$

more preferably $\{V(II) \times (1/C\ (II))\}/\{V(I) \times (1/C(I))\} > 5$, and most preferably $\{V(II) \times (1/C\ (II))\}/\{V(I) \times (1/C(I))\} > 10$.

Satisfying the relationship $\{V(II) \times (1/C\ (II))\}/\{V(I) \times (1/C\ (I))\} > 3$ allows quickly cooling the cavity surface during cooling, and quickly increasing the temperature by the heat stored in the second section during heating.

Further, the thermal conductivity C(I) (J/s·m·K) of the material of the first section is preferably 3.5 times or more the thermal conductivity C(II) (J/s·m·K) of the material of the second section including the second temperature adjusting means, and/or a thermal diffusivity (m²/s) of the material of the first section is preferably 3.5 times or more a thermal diffusivity (m²/s) of the material of the second section. That is, a higher thermal conductivity allows faster cooling during cooling, and a higher thermal conductivity allows more quickly drawing heat from the heat storage area during heating. In particular, in the case where the first section is separated during cooling, higher effects can be achieved. In the case where the first section is not separated during cooling, good thermal conductivity of the first section may result in cooling of even the second section, which has the function of the heat storage area, during cooling, and therefore it is necessary to optimize the materials forming the first and second sections.

It is preferred that at least the material forming the area including the first temperature adjusting means have a thermal conductivity C(I) (J/s·m·K) of 100 J/s·m·K or more. For example, Corson alloy has a thermal conductivity of 165 (J/s·m·K), and carbon steel has a thermal conductivity of 40 (J/s·m·K).

Further, Corson alloy has a thermal diffusivity of $4.63 \times 10^{-5}$ (m²/s), carbon steel has a thermal diffusivity of $1.12 \times 10^{-5}$ (m²/s), and stainless steel has a thermal diffusivity of $4.81 \times 10^{-6}$ (m²/s).

Still further, the material of the first section preferably has a hardness HB of 200 or more, and more preferably 250 or more. The material of the first section having a hardness HB of 200 or more provides sufficient durability for compression molding.

It is more preferred that the first section and the second section be configured to be separable from each other. It is also effective for increasing the molding cycle that, after the cavity is heated to a desired temperature, the die is slightly opened, while the cavity is still closed, to separate the first section 11 and the second section 12, as well as the first section 21 and the second section 22 from each other so that a heat insulation layer of air is provided therebetween.

Specifically, the separation of the first section and the second section from each other while the cavity is still closed can be achieved by inserting the springs 40 between the first section and the second section to slightly open the die. This separation may be performed on at least one of the plurality of die portions.

In the state where the die is separated, cooling water is fed with pressure into the cooling medium paths, or the like, to rapidly cool the first section including the cavity. At this time, the cavity surface of the die is kept closed using a spring or a hydraulic cylinder so that the cavity is not opened. After the cavity surface is kept at temperatures lower than a thermal deformation temperature of the thermoplastic resin for a certain period of time, feeding of the cooling water is stopped, and compressed air is introduced into the cooling medium paths, as necessary, to discharge the water from the cooling medium paths.

In the case where the first temperature adjusting means is comprised of the plurality of cooling medium paths, cooling of the first section can be achieved by flowing the cooling medium through the cooling medium paths; however, whether rapid cooling of the cavity surface can be achieved is determined by how quickly a large amount of the cooling medium can be flown.

For this purpose, it is preferred to provide a structure that allows flowing the cooling medium independently through each cooling medium path. As a specific example, a manifold that allows simultaneously flowing the cooling medium at the same temperature may be used. The manifold may be disposed outside the die on the inlet side of the cooling medium paths, so that the cooling medium fed from the manifold is simultaneously flown through each cooling medium path, and another manifold may be disposed on the cooling medium discharge side to more efficiently achieve discharge of the cooling medium.

The flow rate of the cooling medium largely influences the cooling efficiency. For this purpose, a pressure pump, or the like, may be used as necessary to flow the cooling medium. Further, a commercially available pressurized temperature controller can also be used.

In the case where the manifold is provided, it is preferred that a cooling efficiency, which is represented by a ratio (A/V(III)) between and a flow rate A {L (cm³)/minute} of the cooling medium during cooling and a volume V(III) (cm³) of a portion of the first section 11 of the die portion 10 located between the cavity surface 31 of the die and a plane formed by connecting the central axes X of the plurality of cooling medium paths 13, as shown in FIG. 5, be 15/minute or more, and more preferably 25/minute or more.

The cooling efficiency of 15/minute or more allows performing even higher-cycle molding.

Similarly, for the die portion 20, the cooling efficiency is 15/minute or more, and more preferably 25/minute or more.

Examples of the medium flown through the cooling medium paths include water, a chiller liquid, carbon dioxide, a compressed gas, etc. Further, while a single type of medium may be used, the medium at different temperatures may be flown at different stages. For example, if the cavity is heated to 300° C., pressurized hot water at 150° C. may be flown for several seconds, and thereafter, temperature-controlled water at 60° C. and cooling water at 10° C. may be flown at different stages, and when the temperature of the die has reached a certain temperature, pressurized hot water at 150° C. may be flown again such that the cavity surface is kept at a constant temperature.

In the molding according to the disclosure, in the case where the composite material is placed in the cavity and heat-compression molded in the cavity to melt and then solidify the thermoplastic resin in the composite material to provide a molded body, impregnation of the thermoplastic resin into the strengthening fibers largely influences the properties of the resulting molded body. If air is present in the die, the air forms voids in the melted thermoplastic resin and the voids remain in the molded body, resulting in formation of small un-impregnated portions in the strengthening fibers. Removing such air and any gas generated from the resin from interior of the die allows obtaining a molded body which has been more quickly impregnated with the thermoplastic resin. It is preferred to provide a depressurization path that allows vacuuming the cavity when the die is fastened.

As one type of usage of the die used in the disclosure, it is demanded to heat the composite material in the die to melt the thermoplastic resin. Depending on the type of the thermoplastic resin, the second temperature adjusting means sets, for a non-crystalline resin, the average temperature of the second section at a temperature that is equal to or higher than the glass transition temperature of the thermoplastic resin material placed in the cavity, preferably a temperature that is equal to or higher than the glass transition temperature +30° C., and most preferably a temperature that is equal to or higher than the glass transition temperature +50° C. For a crystalline resin, the second temperature adjusting means sets the average temperature of the second section at a temperature that is equal to or higher than the melting point of the thermoplastic resin material placed in the cavity, preferably a temperature that is equal to or higher than the melting point +30° C., and most preferably a temperature that is equal to or higher than the melting point +50° C.

The average temperature of the second section refers to the average temperature of the second section of the die. As one example of a method used measure the average temperature, a method where thermometers are placed in the interior of the die at a position in the vicinity of the second temperature adjusting means and at a distance of 10 mm to 30 mm from the second temperature adjusting means to measure the temperatures at that positions may be used. In the case where cartridge heaters are used as the second temperature adjusting means, the temperature control may be achieved by sensing the above-mentioned temperatures and controlling on/off of the power supply, or using PID control (Proportional-Integral-Differential Controller) to adjust the capacity of the power supply.

The second temperature adjusting means is not particularly limited, and heaters using a heating medium, such as heating oil or steam, electric resistance, etc., may be used, besides the rod-shaped cartridge heaters. However, in order to keep the die at a high temperature that is equal to or higher than the melting point of the thermoplastic resin, heaters that apply heat are preferred in view of versatility and performance. Such heaters include ceramic heaters, sheathed heaters, etc.; however, rod-shaped cartridge heaters are preferably used in view of convenience and performance.

In this embodiment, the case where each of the die portion 10 and the die portion 20 is configured such that the first section 11, 21 and the second section 12, 22 are able to be spaced apart from each other. However, the first section 11, 21 and the second section 12, 22 may be integrally formed using an adhesive, or the like, without providing the springs 40.

Further, since the heat insulation panels 15, 25 serve to minimize the flow of heat due to thermal conduction from the die portion including the second temperature adjusting means to the molder, the heat insulation panels 15, 25 are preferably disposed at the connection between the die 100 and the molder (not shown).

While the above-described molding die is applicable to compression molding, it is also applicable to hybrid molding, where compression molding is performed, and then injection molding is performed to melt and charge the thermoplastic resin. The hybrid molding can be achieved by providing a mechanism that allows injection molding, such as a sprue forming part, a runner forming part, etc., as appropriate.

Thermoplastic Resin-Fiber Composite Material

The compression molding method of the disclosure is effective to mold a thermoplastic resin-fiber composite material.

The thermoplastic resin-fiber composite material consists of strengthening fibers and a thermoplastic resin.

Strengthening Fibers

As the strengthening fibers, those commonly used as a fiber-strengthened composite material can be used, and examples thereof include at least one selected from the group consisting of glass fibers, carbon fibers, aramid fibers, superstrong polyethylene fibers, polybenzazole fibers, liquid crystal polyester fibers, polyketone fibers, metallic fibers, and ceramic fibers. In view of mechanical properties, thermal properties, and versatility, glass fibers, carbon fibers, and aramid fibers are preferred, and in view of economy, glass fibers are preferred.

In the case where glass fibers are selected as the strengthening fibers, a sizing agent may be used. The sizing agent preferably consists of a silane coupling agent, a lubricant, and a binder.

As to details of the glass fibers and the sizing agent, those described in Patent Document 1 can be used, as appropriate.

Aspects of Strengthening Fibers

The strengthening fibers preferably have a single yarn number in the range from 30 to 15,000, in view of fiber openability and handling during a fiber blending process.

In the case where carbon fibers are selected as the strengthening fibers, the sizing agent preferably consists of a lubricant and a binder.

The types of the sizing agent, the lubricant, and the binder are not particularly limited, and those known in the art can be used. As specific examples, materials described in Patent Document 1 can be used.

In the cases where other strengthening fibers are used, the type and the amount of the sizing agent may be selected as appropriate from those used with glass fibers and carbon fibers depending on the properties of the strengthening fibers, and it is preferred to determine the type and the amount of the sizing agent based on the sizing agent used with carbon fibers.

Thermoplastic Resin

The thermoplastic resin is not particularly limited, and those commonly used in the art can be used. Preferred examples thereof include strengthening fibers obtained by melting and spinning at least one thermoplastic resin selected from: polyolefin resins, such as polyethylene, polypropylene; polyamide resins, such as polyamide 6, polyamide 66, polyamide 46; polyester resins, such as polyethylene terephthalate, polybutylene terephthalate, polytrimethylene terephthalate; polyacetal resins, such as polyoxymethylene; polycarbonate resins; polyether ketone; polyether ether ketone; polyether sulfone; polyphenylene sulfide; thermoplastic polyether imide; thermoplastic fluorine resins, such as tetrafluoroethylene-ethylene copolymer;

and modified thermoplastic resins obtained by modifying these resins. Among these thermoplastic resins, polyolefin resins, polyamide resins, polyester resins, polyether ketone, polyether ether ketone, polyether sulfone, polyphenylene sulfide, thermoplastic polyether imide, and thermoplastic fluorine resins are preferred. In view of mechanical physical properties and versatility, polyolefin resins, modified polyolefin resins, polyamide resins, and polyester resins are more preferred. Further, in view of thermal physical properties, polyamide resins and polyester resins are even more preferred. Still further, in view of durability against repeated load, polyamide resins are still more preferred, and polyamide 66 can be suitably used.

Polyester Resins

The polyester resins refer to polymer compounds having a —CO—O-(ester) bond on the main chain. Examples thereof include, but not limited to, polyethylene terephthalate, polybutylene terephthalate, polytetramethylene terephthalate, poly-1,4-cyclohexylene dimethylene terephthalate, polyethylene-2,6-naphthalene dicarboxylate, etc.

As to details of other polyester resins, those described in Patent Document 1 can be used, as appropriate.

Polyamide Resins

The polyamide resins refer to polymer compounds having a —CO—NH-(amide) bond on the main chain. Examples thereof include, but not limited to, polyamide obtained through ring-opening polymerization of lactam, polyamide obtained through self-condensation of ω-aminocarboxylic acid, polyamide obtained through condensation of diamine and dicarboxylic acid, and copolymers thereof. These polyamides may be used alone or as a mixture of two or more of them. As to details of lactam, diamine (monomer), and dicarboxylic acid (monomer), those described in Patent Document 1 can be used, as appropriate.

Specific examples of the polyamide include polyamide 4 (poly α-pyrrolidone), polyamide 6 (polycaproamide), polyamide 11 (polyundecane amide), polyamide 12 (polydodecane amide), polyamide 46 (polytetramethylene adipamide), polyamide 66 (polyhexamethylene adipamide), polyamide 610, polyamide 612, polyamide 6T (polyhexamethylene terephthalamide), polyamide 9T (polynonane methylene terephthalamide), and polyamide 6I (polyhexamethylene isophthalamide), as well as copolymerized polyamides containing these polyamides as a constituent.

Examples of the copolymerized polyamide include a copolymer of hexamethylene adipamide and hexamethylene terephthalamide, a copolymer of hexamethylene adipamide and hexamethylene isophthalamide, and a copolymer of hexamethylene terephthalamide and 2-methylpentane diamine terephthalamide.

In this embodiment, the thermoplastic resin-fiber composite material preferably consists of a thermoplastic resin and strengthening fibers. For example, a fiber blended yarn may be used. A specific method used to produce the fiber blended yarn is not particularly limited, and a known method for fiber blending can be used. Examples thereof include: a fiber opening and yarn doubling method, wherein fiber opening is performed using an external force, such as pressure produced by an electrostatic force or fluid spraying, or pressure produced by pressing with a roller, and then yarn doubling or pull-aligning is performed in the state where the strengthening fibers and the thermoplastic resin fibers are opened; and an interlace method. Among them, the interlace method is preferred, which allows minimizing damage to the strengthening fibers, provides excellent fiber openability, and allows uniform blending. Examples of the interlace method include: a method wherein two or more vortex and turbulence zones of a fluid, such as air, nitrogen gas, and steam is generated substantially parallel to the yarn axes, and the fibers are guided into these zones to be formed into a non-bulky yarn under tension which does not form loops or crimps; and a method (a fiber opening and interlace method) wherein only the strengthening fibers are subjected to fiber opening, or both the strengthening fibers and the thermoplastic resin fibers are subjected to fiber opening, and then interlacing is performed. In particular, it is preferred to apply false twisting to the thermoplastic resin fibers alone in a process that includes heating, and then perform fiber blending using the interlace method in a continuous manner on the same machine.

As to details of the fiber blending, the method described in Patent Document 1 can be used, as appropriate.

The thermoplastic resin forming the thermoplastic resin-fiber composite material may be a composite yarn that is obtained by applying a coating to the strengthening fibers, or impregnating the strengthening fibers with the thermoplastic resin. Coating or impregnation of the thermoplastic resin may be performed during production of the strengthening fibers, or may be performed in a separate process after the strengthening fibers are produced.

The form of the thermoplastic resin-fiber composite material is not particularly limited, and may be a sheet, a film, or a pellet; however, a fabric cloth is preferred in view of handling and flexibility of the shape.

A method used to obtain the fabric cloth is not particularly limited, and a known method for producing a suitable fabric cloth, which is selected depending on the application and the purpose, can be used. For example, a fabric at least partially including the composite yarn can be produced using a loom, such as a shuttle loom, a rapier loom, an air jet loom, or a water jet loom. Preferably, such a fabric may be obtained by inserting weft yarns through warp yarns of the fibers including the composite yarn. A knit can be produced using a knitting machine, such as a latch needle circular knitting machine, a flatbed knitting machine, a tricot knitting machine, or a raschel knitting machine to knit the fibers at least partially including the composite yarn. A non-woven fabric can be obtained by forming a sheet-like collection of fibers called "web" of the fibers at least partially including the composite yarn, and then bonding the fibers by using a physical action, such as using a needlepunching machine, a stitchbonding machine, or a columnar jet flow machine, by using a thermal action, such as using an emboss roll, or by using an adhesive.

As to other forms, etc., of the fabric cloth, the method described in Patent Document 1 can be used, as appropriate.

In the case where a fabric cloth is used as the base material, the base material can be cut into a desired shape using a water jet cutter, a laser cutter, a plotter cutter, an ultrasonic cutter, a super steel blade press cutter, a hot knife press cutter, etc. In view of economy, productivity, and performance, a hot knife press cutter is preferred. The temperature of the blade of the hot knife press cutter is set as appropriate depending on the material to be cut, and is a temperature that is equal to or higher than the melting point or glass transition temperature of the thermoplastic resin, preferably a temperature that is equal to or higher than the melting point +30° C. or the glass transition temperature +30° C., and more preferably a temperature that is equal to or higher than the melting point +70° C. or the glass transition temperature +70° C.

EXAMPLES

Now, the present disclosure is more specifically described with reference to examples. Materials, used amounts, ratios, process conditions, etc., shown in the following examples can be changed as appropriate without departing from the spirit and scope of the disclosure. The scope of the disclosure is therefore not limited to the specific examples shown below.

Example 1

The die shown in FIGS. 3 to 5 was used. The configuration of the die is shown below.
First Section, Second Section The first sections 11, 21 including the cooling medium paths 13, 23 were made using Corson alloy (MOLD MAX-V (trade name), available from Materion Brush, having a thermal conductivity of 165 J/s·m·K and a hardness HB of 270).

The second sections 12, 22 including the rod-shaped cartridge heaters 14, 24 were made using carbon steel (S55C) having a thermal conductivity of 40 J/s·m·K.

No spring was provided between the first sections and the second sections of the die, and the first sections and the second sections were not separated from each other during molding. Also, vacuuming of the interior of the die was not performed during molding.

Rod-Shaped Cartridge Heaters

As the rod-shaped cartridge heaters 14, 24, 1600 W rod-shaped cartridge heaters (10 mm φ×400 mm, watt density 12.7 W/cm², available from Hakko Electric Co., Ltd.) were used. The heat density of the die (total heating capacity of the second section (kW)/weight of the first section (kg)) was 0.75 kW/kg.

Cooling Medium Paths L0, L1, L2

As the cooling medium paths 13, 23, ten cooling water paths, each having an inner diameter of 8 mm, were provided at 26 mm intervals (L) at positions where the distance L0 (see FIG. 4) from the centers of the cooling medium paths to the cavity surface was 10 mm.

The distance L2 (see FIG. 4) from the centers of the cooling medium paths to the centers of the rod-shaped cartridge heaters was 25 mm.

Thickness T1 of First Sections, Thickness T2 of Second Sections

As shown in FIG. 5, a thickness (T1) of the first sections of the die was 30 mm, and a thickness (T2) of the second sections of the die was 30 mm.

Cooling water was flown in parallel within the die via the manifold. The flow rate A of the cooling water was 25000 cm³/minute for each of the upper die and the lower die.

Cooling Efficiency A/V(III)

The volume V(III) of a portion located between the cavity surface 31 (or 32) and a plane formed by connecting the central axes X of the plurality of cooling medium paths was 842.4 cm³. The cooling efficiency A/V(III) was 30/minute.

Glass fibers with a fineness of 685 dtex and a single yarn number of 400 to which the sizing agent shown below was adhered in an amount of 1.0 mass % were used as the continuous strengthening fibers.

Composition of Sizing Agent (In Solid Equivalent)
Silane coupling agent: 0.6 mass % of γ-aminopropyltriethoxysilane (KBE-903 (trade name), available from Shin-Etsu Chemical Co., Ltd.)
Lubricant: 0.1 mass % of wax (CARNAUBA WAX (trade name), available from S.KATO & CO.)
Binder: 5 mass % of acrylate/maleate copolymer salt (AQUALIC TL (trade name), available from Nippon Shokubai Co., Ltd.)
Fabric Cloth As the thermoplastic resin fibers, polyamide 66 fibers (LEONA® 470/144BAU (trade name), available from Asahi Kasei Fiber Corporation) with a fineness of 470 dtex and a single yarn number of 144, which were not interlaced, were used.

Two bundles of glass fibers with a fineness of 685 dtex and a single yarn number of 400, and two bundles of PA fibers with a fineness of 470 dtex were subjected to yarn doubling, and pull-aligned, and then fed to an interlace nozzle in a substantially vertical direction to be interlaced under the conditions shown below, to obtain a composite yarn.

Interlacing nozzle: KC-AJI-L, available from KYOCERA Corporation (1.5 mm diameter, propelling type)
Air pressure: 2 kg/cm²
Processing speed: 30 m/minute The composite yarn was used as warp yarns and weft yarns to weave a fabric (fabric cloth) with a warp density of 6 yarns/5 mm and a weft density of 6 yarns/5 mm. During weaving, no formation of fluff and fibril was observed, and no adhesion of lint and pill to the loom was observed, and thus good weavability was achieved.

Seven sheets of the fabric cloth were stacked and cut into a desired shape conforming to the compression molder. The stuck of seven sheets was cut using a hot knife heated to a temperature of 330° C. The cut surfaces were fused together, and a base material with excellent handleability was provided.

Molding Method

A molded body was produced through the following steps according to the compression molding process shown in FIG. 1.

As the molder, S100V-8A, available from Toshiba Machine Co., Ltd., with a maximum fastening force of 300 tons was used. Detailed conditions of the die and the process are shown in Table 1.

Step 1 (setting the fabric cloth and fastening the die): The die was opened, and the stack of seven sheets of the fabric cloth cut into the desired shape was set in a predetermined position in the die when the temperature of the cavity surface was 180° C., and then the die was fastened with a fastening force of 240 MPa.

Step 2 (heating the die): While the die was fastened, the cavity surface was rapidly heated to a temperature of 300° C. to melt the polyamide resin forming the fabric cloth in the die to impregnate the continuous glass fibers with the polyamide resin. At this time, the temperature of the heated portion of the die was set at 350° C.

Step 3 (separating and cooling the die): The fastening force was decreased while the cavity was still closed, and cooling water at 25° C. was flown through the cooling medium paths to rapidly cool the cavity surface. Five seconds after the temperature of the cavity surface reached 150° C., feeding of the cooling water was stopped. Then, ten seconds after the feeding of the cooling water was stopped, the die was opened and, simultaneously with that, the water in the cooling medium paths was discharge using compressed air.

Step 4 (releasing): The molded body was released from the die and immediately removed from the die, and then the process was returned to Step 1.

The temperature increase rate of the cavity temperature in Example 1 was 150° C./minute, the temperature decrease rate was 600° C./minute, and the molding cycle was 90 seconds.

Dimensions the resulting molded body were 250 mm×250 mm with a thickness of 2 mm.

The temperature decrease rate refers to a temperature decrease rate when the cavity surface was cooled from a target high temperature (the cavity temperature of 300° C. in the above example) to a target low temperature (the cavity temperature of 150° C. in the above example). The temperature increase rate refers to a temperature increase rate when the temperature of the cavity was increased from the target low temperature to the target high temperature. The temperature of the cavity surface was determined based on a correlative relationship between a temperature of the cavity surface and a temperature in the vicinity of the cavity surface in advance, and actual temperature control during molding was performed based on the temperature in the vicinity of the cavity surface.

Example 2

A molded body was obtained in the same manner as in Example 1, except that, in Step 1 (setting the fabric cloth and fastening the die), the die was opened, and the stack of seven sheets of the fabric cloth cut into the desired shape was set in a predetermined position in the die when the temperature of the cavity surface was 300° C., and then the die was fastened with a fastening force of 240 MPa.

Similarly to Example 1, the heat density and the cooling efficiency in Example 2 were 0.75 kW/kg and 30/minute, respectively.

Example 3

A molded body was produced in the same manner as in Example 1, except that carbon steel was used to form the first sections of the die.

In Example 3, the temperature increase rate of the cavity temperature was 110° C./minute, the temperature decrease rate was 300° C./minute, and the molding cycle was 180 seconds.

In Example 3, the heat density was 0.83 kW/kg, and the cooling efficiency was 30/minute.

Example 4

A molded body was produced in the same manner as in Example 1, except that carbon steel was used to form the first sections of the die, 1000 W heaters (GLE4103, 10 mm φ×400 mm, watt density 8.3 W/cm$^2$, available from Hakko Electric Co., Ltd.) were used, a die having a thickness (T1) of the first sections of 40 mm and a thickness (T2) of the second sections of 100 mm was used, hoses were joined such that the cooling water flew in series within the die, and the fabric cloth was set in the die in Step 1 when the die surface temperature reached 300° C.

In Example 4, the temperature increase rate of the cavity temperature was 60° C./minute, the temperature decrease rate was 100° C./minute, and the molding cycle was 300 seconds.

In Example 4, the heat density was 0.1 kW/kg, and the cooling efficiency was 6/minute.

Example 5

A molded body was produced in the same manner as in Example 1, except that a die having a thickness (T1) of the first sections of 60 mm and a thickness (T2) of the second sections of 240 mm was used, and hoses were joined such that the cooling water flew in series within the die without using a manifold.

In Example 5, the temperature increase rate of the cavity temperature after the die temperature initially reached 150° C. was 40° C./minute, the temperature decrease rate was 120° C./minute, and the molding cycle was 280 seconds. The time taken to initially heat the die to 150° C. was 3 times the time taken in Example 1.

In Example 5, the heat density was 0.75 kW/kg, and the cooling efficiency was 10/minute.

Example 6

A molded body was produced in the same manner as in Example 1, except that 1000 W heaters (GLE4103, 10 mm φ×400 mm, watt density 8.3 W/cm$^2$, available from Hakko Electric Co., Ltd.) were used, and the flow rate A of the cooling water was set at 12000 cm$^3$/minute.

In Example 6, the temperature increase rate of the cavity temperature was 100° C./minute, the temperature decrease rate was 450° C./minute, and the molding cycle was 150 seconds.

In Example 6, the heat density was 0.24 kW/kg, and the cooling efficiency was 15/minute.

Example 7

A die having the cooling medium paths 13, 23 with an inner diameter of 8 mm provided at 20 mm intervals (L) at positions where the distance L0 from the centers of the cooling medium paths to the cavity surface was 10 mm was used, and the cavity was vacuumed during molding.

The distance L2 from the centers of the cooling medium paths to the centers of the rod-shaped cartridge heaters was 40 mm.

1000 W rod-shaped cartridge heaters (GLE4103, 10 mm φ×400 mm, watt density 8.3 W/cm$^2$, available from Hakko Electric Co., Ltd.) were used.

Springs were provided between the first sections and the second sections of the die, and, for each of the upper die and the lower of the die, the first section and the second section were separated from each other by a distance of 5 mm during cooling.

The thickness (T1) of the first sections of the die was 60 mm, and the thickness (T2) of the second sections was 240 mm. That is, the thickness (L1) of the die was 300 mm.

The cooling water was flown in parallel within the die via a manifold. For each of the upper die and the lower die, the flow rate A of the cooling water was 25000 cm$^3$/minute.

The volume V(III) of a portion located between the cavity surface 31 (or 32) and a plane formed by connecting the central axes of the plurality of cooling medium paths X was 1667 cm$^3$. The cooling efficiency A/V(III) was 15/minute.

In Example 7, the temperature increase rate of the die was 200° C./minute, the temperature decrease rate was 500° C./minute, and the molding cycle was 90 seconds.

In Example 7, the heat density was 0.24 kW/kg, and the cooling efficiency was 15/minute.

Example 8

A molded body was produced in the same manner as in Example 7, except that carbon steel was used as the material of the cavity surface side-portion of each die portion, the separation between the first section and the second section was 10 mm, and the die temperature was set at 320° C. In Example 8, the temperature increase rate of the die was 150° C./minute, the temperature decrease rate was 300° C./minute, and the molding cycle was 120 seconds.

In Example 8, the heat density was 0.25 kW/kg, and the cooling efficiency was 15/minute.

Example 9

A molded body was produced in the same manner as in Example 7, except that the first section and the second section were not separated from each other during cooling of the cavity surface, the cavity was not vacuumed during molding, and the die temperature was set at 320° C. In Example 9, the temperature increase rate of the die was 70° C./minute, the temperature decrease rate was 400° C./minute, and the molding cycle was 220 seconds.

In Example 9, the heat density was 0.24 kW/kg, and the cooling efficiency was 15/minute.

Example 10

A molded body was produced in the same manner as in Example 7, except that carbon steel was used as the material of the first sections on the cavity surface side, the first section and the second section were not separated from each other during cooling of the cavity surface, the cavity was not vacuumed during molding, and the die temperature was set at 320° C. In Example 10, the temperature increase rate of the die was 100° C./minute, the temperature decrease rate was 300° C./minute, and the molding cycle was 230 seconds.

In Example 10, the heat density was 0.25 kW/kg, and the cooling efficiency was 15/minute.

Example 11

A molded body was produced in the same manner as in Example 7, except that carbon steel was used as the material of the first sections on the cavity surface side, the distances L0, L1, and L2 were changed such that L0=30 mm, L1=200 mm, and L2=50 mm, the first section and the second section were not separated from each other during cooling of the cavity surface, the cavity was not vacuumed during molding, and the die temperature was set at 320° C. In Example 11, the temperature increase rate during heating of the die was 60° C./minute, the cooling rate was 150° C./minute, and the molding cycle was 280 seconds.

In Example 11, the heat density was 0.25 W/kg, and the cooling efficiency was 5/minute.

Example 12

A molded body was produced in the same manner as in Example 7, except that carbon steel was used as the material of the first sections on the cavity surface side, the distances L0, L1, and L2 were changed such that L0=30 mm, L1=150 mm, and L2=50 mm, the first section and the second section were not separated from each other during cooling of the cavity surface, the cavity was not vacuumed during molding, and the die temperature was set at 320° C. In Example 12, the temperature increase rate during heating of the die was 50° C./minute, the cooling rate was 150° C./minute, and the molding cycle was 300 seconds.

In Example 12, the heat density was 0.25 kW/kg, and the cooling efficiency was 5/minute.

Example 13

Figure 6:
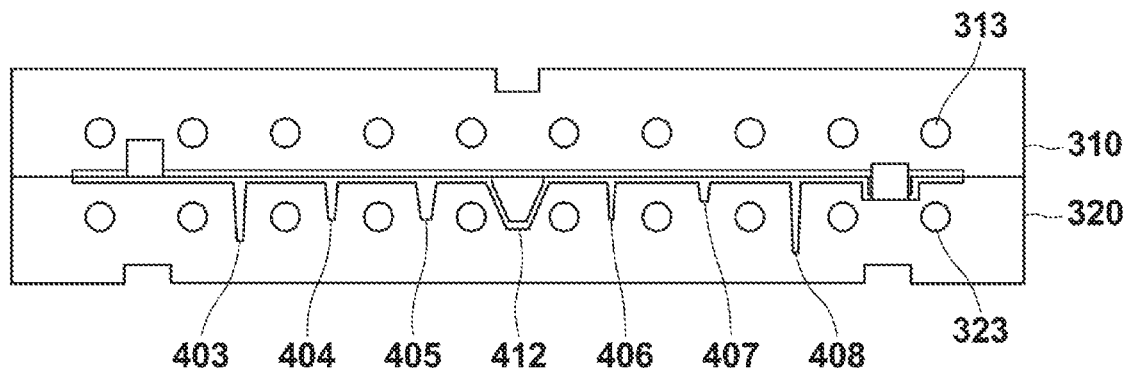
FIG. 6 is a schematic sectional view of die portions of a die used in Example 13.
Figure 7:
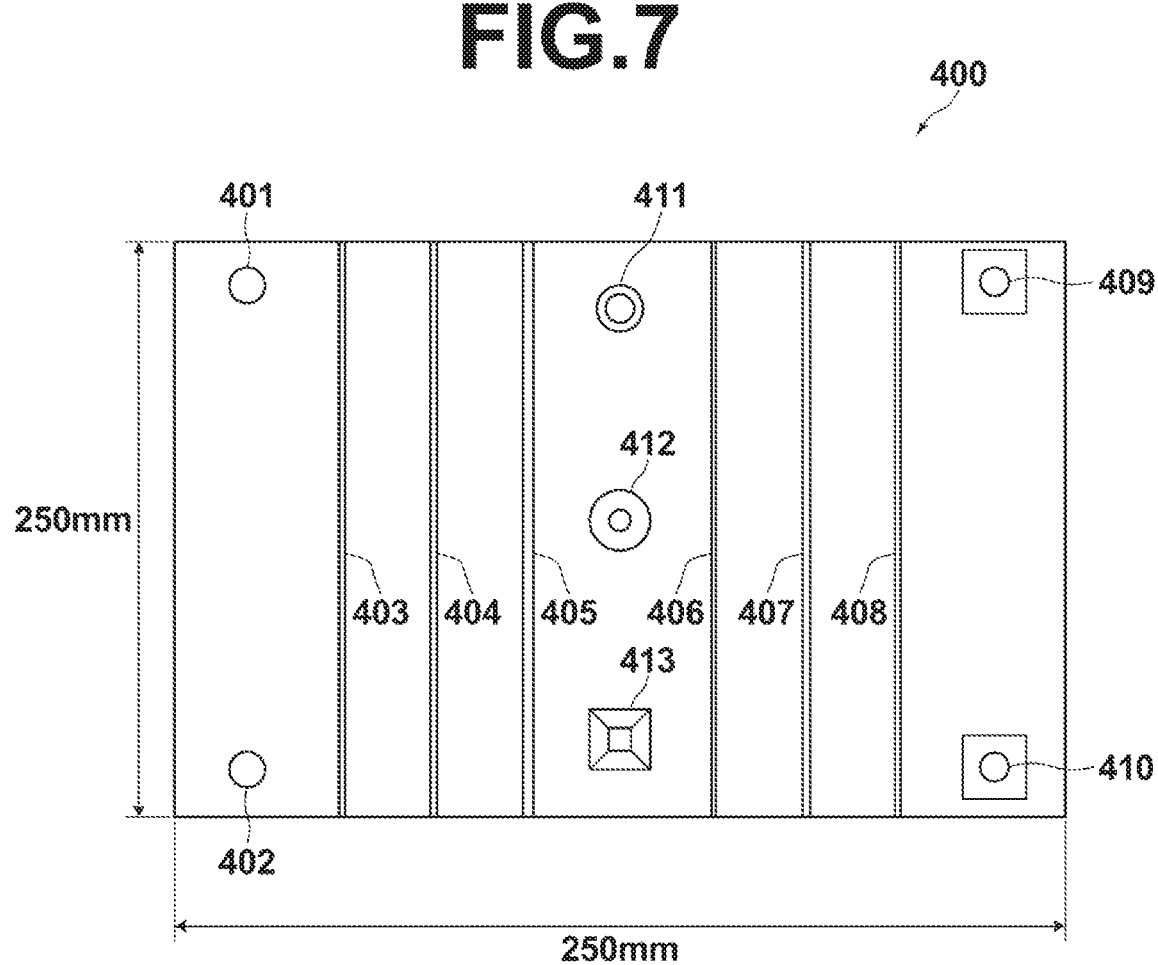
FIG. 7 is a schematic plan view of a molded body produced in Example 13.

A molded body 400 shown in FIG. 7 was produced using a die, as shown in FIG. 6, including first sections 310, 320 that include a first temperature adjusting means 313 and a second temperature adjusting means 323. In Example 13, the temperature increase rate during heating of the die was 180° C./minute, the cooling rate was 420° C./minute, and the molding cycle was 100 seconds. Outer dimensions of the molded body 400 were 250 mm×250 mm with a thickness of 2 mm. A hole 401 had a diameter of 15 mm, and a hole 402 had a diameter of 10 mm.

As shown in FIGS. 6 and 7, a rib 403 had a 3 mm-wide base, a 1.5 mm-wide tip, and a height of 15 mm. A rib 404 had a 3 mm-wide base, a 1.5 mm-wide tip, and a height of 10 mm. A rib 405 had a 5 mm-wide base, a 3 mm-wide tip, and a height of 10 mm. A rib 406 had a 1.5 mm-wide base, a 0.8 mm-wide tip, and a height of 10 mm. A rib 407 had a 5 mm-wide base, a 4 mm-wide tip, and a height of 5 mm. A rib 408 had a 3 mm-wide base, a 1.5 mm-wide tip, and a height of 20 mm.

A boss 409 had a height of 8 mm and a wall thickness of 2 mm, with a hole having a diameter of 8 mm formed in a square pillar having 26 mm-long sides. A boss 410 had a height of 8 mm and a wall thickness of 2 mm, with a hole having a diameter of 6 mm formed in a square pillar having 26 mm-long sides.

A conic pillar 411 was in the form of a boss having a base portion outer diameter of 13.8 mm, a top portion outer diameter of 8 mm, a height of 15 mm, and a wall thickness of 2 mm. A conic pillar 412 was in the form of a boss having a base portion outer diameter of 28.5 mm, a top portion outer diameter of 17.5 mm, a height of 15 mm, and a wall thickness of 2 mm. A square pyramid pillar 413 had a square base portion having 28.5 mm-long sides, a top portion having 17.5 mm-long sides, a height of 15 mm, and a wall thickness of 2 mm.

A sheet of the fabric cloth was pushed into the rib portions in advance, and a stack of seven sheets of the fabric cloth were placed on the bottom surface portion to be compressed and molded.

The same die as that used in Example 7, where the material of the first section on the cavity surface side was the same Corson alloy as that used in Example 7, was used, except that the distances L0, L1, and L2 were changed such that L0=15 mm, L1=300 mm, and L2=30 mm. In Example 13, the temperature increase rate during heating of the die was 180° C./minute, the cooling rate was 420° C./minute, and the molding cycle was 100 seconds.

In Example 13, the heat density was 0.24 kW/kg, and the cooling efficiency was 10/minute.

The resulting molded body had excellent strength that allowed forming the portions having complex shapes, such as the conic pillars 411, 412 and the square pyramid pillar 413 without breaking the glass fibers in the molded body having the ribs and bosses.

Comparative Example 1

A molded body was produced using the die shown in FIG. 3, where L0=70 mm, L1=200 mm, and L2=40 mm, and heaters for heating the die were disposed at positions closer to the cavity surface than the cooling medium paths.

The same materials as those used in Example 7 were used. The die temperature was set at 320° C. The first section and the second section were not separated from each other during cooling of the cavity surface. The cooling water paths of the die were joined in series such that the cooling water flew continuously rather than simultaneously.

Evaluation Conditions

Tension Strength

Tensile strength was measured according to ISO 527-1 under the following conditions.

Testing environment: 23° C., 50RH %
Molded product: No. 3 test piece according to HS K7113
Tensile speed: 5 mm/minute
Inter-chuck distance: 50 mm
Used equipment: INSTRON 50 kN (available from Instron)

Bending Stiffness

Bending stiffness was measured according to ISO 178 under the following conditions.

Testing environment: 23° C., 50RH %
Molded product: 10 mm-wide, 100 mm-long, and 2 mm-thick strip
Test speed: 1 mm/minute
Inter-span: 32 mm
Used equipment: INSTRON 50 kN (available from Instron)

Bending Strength

Bending strength was found according to ISO178.

Maximum Impact Strength

Maximum impact strength was measured according to JIS K7211-1: 2006 under the following conditions.

Testing environment: 23° C.
High-speed impact tester: SHIMADZU HYDRO SHOT HITS-P10 (available from Shimadzu Corporation)
Shape of test piece: 60 mm×60 mm flat plate with a thickness of 2 mm
Test speed: 4.4 mm/s Maximum Impact Point Energy Maximum impact point energy was found according to JIS K7211-2: 2006.

Production conditions and physical properties of the resulting molded bodies of the examples and comparative examples are shown in Tables 1 and 2.

TABLE 1

| | | | Example 1 | Example 2 | Example 3 | Example 4 | Example 5 | Example 6 |
|---|---|---|---|---|---|---|---|---|
| Die | L1, L0 (mm) | | L0 = 10 | L0 = 10 | L0 = 10 | L0 = 20 | L0 = 10 | L0 = 10 |
| | | | L1 = 60 | L1 = 60 | L1 = 60 | L1 = 140 | L1 = 300 | L1 = 60 |
| | L1/L0 | | 6 | 6 | 6 | 7 | 30 | 6 |
| | L2 (mm) | | 25 | 25 | 25 | 70 | 40 | 25 |
| | T1 (mm) | | 30 | 30 | 30 | 40 | 60 | 30 |
| | T2 (mm) | | 30 | 30 | 30 | 100 | 240 | 30 |
| | V0/V(I) | | 2 | 2 | 2 | 2.5 | 15 | 2 |
| | Material | first section | Corson alloy | Corson alloy | carbon steel | carbon steel | Corson alloy | Corson alloy |
| | | second section | carbon steel | carbon steel | carbon steel | carbon steel | carbon steel | carbon steel |
| | Separation distance | upper die | no separation | no separation | no separation | no separation | no separation | no separation |
| | during cooling (mm) | lower die | no separation | no separation | no separation | no separation | no separation | no separation |
| | Manifold | | provided | provided | provided | none | none | provided |
| | Vacuum | | none | none | none | none | none | none |
| | Die temperature when fabric cloth was set (° C.) | | 180 | 300 | 180 | 300 | 180 | 180 |
| | Die temperature (° C.) | | 350 | 350 | 350 | 350 | 320 | 350 |
| | Target high temperature (° C.) | | 300 | 300 | 300 | 300 | 300 | 300 |
| | Target low temperature (° C.) | | 150 | 150 | 150 | 150 | 150 | 150 |
| | Temperature difference (° C.) | | 150 | 150 | 150 | 150 | 150 | 150 |
| Cycle | Heaters | | provided | provided | provided | provided | provided | provided |
| | Temperature increase rate (° C./minute) | | 150 | 150 | 110 | 60 | 40 | 100 |
| | Temperature decrease rate (° C./minute) | | 600 | 600 | 300 | 100 | 120 | 450 |
| | Cycle time (seconds) | | 90 | 90 | 180 | 300 | 280 | 150 |
| Results of evaluation | Tensile strength (MPa) | | 370 | 270 | 390 | 270 | 400 | 400 |
| | Bending stiffness (MPa) | | 20 | 17 | 20 | 18 | 20 | 20 |
| | Bending strength (MPa) | | 540 | 450 | 540 | 450 | 540 | 540 |
| | Maximum impact strength (kN) | | 4.5 | 3 | 4 | 3 | — | 4 |
| | Maximum impact point energy (J) | | 12 | 8 | 11 | 8 | — | 11 |
| | Appearance | | good | disturbance in fibers, surface yellowing | good | disturbance in fibers, surface yellowing | slight yellowing | good |

TABLE 2

| | | | Example 7 | Example 8 | Example 9 | Example 10 |
|---|---|---|---|---|---|---|
| Die | L1, L0 (mm) | | L0 = 10 | L0 = 10 | L0 = 10 | L0 = 10 |
| | | | L1 = 300 | L1 = 300 | L1 = 300 | L1 = 300 |
| | L1/L0 | | 30 | 30 | 30 | 30 |
| | L2 (mm) | | 40 | 40 | 40 | 40 |
| | T1 (mm) | | 60 | 60 | 60 | 60 |
| | T2 (mm) | | 240 | 240 | 240 | 240 |
| | V0/V(I) | | 15 | 15 | 15 | 15 |
| | Material | first section | Corson alloy | carbon steel | Corson alloy | carbon steel |
| | | second section | carbon steel | carbon steel | carbon steel | carbon steel |
| | Separation distance | upper die | 5 | 10 | no separation | no separation |
| | during cooling (mm) | lower die | 5 | 10 | no separation | no separation |
| | Manifold | | provided | provided | provided | provided |
| | Vacuuming | | performed | performed | none | none |
| | Die temperature when fabric cloth was set (° C.) | | 180 | 180 | 180 | 180 |
| | Die temperature (° C.) | | 350 | 320 | 320 | 320 |
| | Target high temperature (° C.) | | 300 | 300 | 300 | 300 |
| | Target low temperature (° C.) | | 150 | 150 | 150 | 150 |
| | Temperature difference (° C.) | | 150 | 150 | 150 | 150 |

TABLE 2-continued

| | | Example 11 | Example 12 | Example 13 | Comparative Example 1 |
|---|---|---|---|---|---|
| Cycle | Heaters | provided | provided | provided | provided |
| | Temperature increase rate (° C./minute) | 200 | 150 | 70 | 100 |
| | Temperature decrease rate (° C./minute) | 500 | 300 | 400 | 300 |
| | Cycle time (seconds) | 90 | 120 | 220 | 230 |
| Results of evaluation | Tensile strength (MPa) | 450 | 440 | 400 | 400 |
| | Bending stiffness (MPa) | 20 | 20 | 20 | 20 |
| | Bending strength (MPa) | 600 | 560 | 540 | 540 |
| | Maximum impact strength (kN) | 4.5 | 4 | — | — |
| | Maximum impact point energy (J) | 12.0 | 11 | — | — |
| | Appearance | good | good | good | good |

| | | | Example 11 | Example 12 | Example 13 | Comparative Example 1 |
|---|---|---|---|---|---|---|
| Die | L1, L0 (mm) | | L0 = 30 L1 = 200 | L0 = 30 L1 = 150 | L0 = 15 L1 = 300 | L0 = 70 L1 = 200 |
| | L1/L0 | | 6.6 | 5 | 20 | 2.86 |
| | L2 (mm) | | 50 | 50 | 30 | 40 |
| | T1 (mm) | | 60 | 60 | 60 | 60 |
| | T2 (mm) | | 240 | 240 | 240 | 240 |
| | V0/V(I) | | 3.3 | 2.5 | 10 | — |
| | Material | first section | carbon steel | carbon steel | Corson alloy | Corson alloy |
| | | second section | carbon steel | carbon steel | carbon steel | carbon steel |
| | Separation distance during cooling (mm) | upper die | no separation | no separation | 5 | no separation |
| | | lower die | no separation | no separation | 5 | no separation |
| | Manifold | | provided | provided | provided | none |
| | Vacuuming | | none | none | none | none |
| | Die temperature when fabric cloth was set (° C.) | | 180 | 180 | 180 | 180 |
| | Die temperature (° C.) | | 320 | 320 | 350 | 320 |
| | Target high temperature (° C.) | | 300 | 300 | 300 | 300 |
| | Target low temperature (° C.) | | 150 | 150 | 150 | 150 |
| | Temperature difference (° C.) | | 150 | 150 | 150 | 150 |
| Cycle | Heaters | | provided | provided | provided | provided |
| | Temperature increase rate (° C./minute) | | 60 | 50 | 180 | 4 |
| | Temperature decrease rate (° C./minute) | | 150 | 150 | 420 | 6 |
| | Cycle time (seconds) | | 280 | 300 | 100 | 3600 |
| Results of evaluation | Tensile strength (MPa) | | 420 | 420 | 420 | 420 |
| | Bending stiffness (MPa) | | 20 | 20 | 20 | 20 |
| | Bending strength (MPa) | | 550 | 550 | 550 | 550 |
| | Maximum impact strength (kN) | | — | — | 4.5 | 4 |
| | Maximum impact point energy (J) | | — | — | 12.0 | 11 |
| | Appearance | | good | slight yellowing | good | yellowing |

As can be seen from the examples shown in Tables 1 and 2, the molded products produced using the molding die of the disclosure had excellent strength and achieved reduction of the cycle time.

In particular, Examples 1, 3, and 6, in which the fabric cloth was set in the die when the cavity temperature of the die was 180° C., exhibited good appearance of the molded body with no yellowing. Examples 2 and 4, in which the fabric cloth was set in the die when the cavity temperature of the die was 300° C., exhibited excellent strength, although slight disturbance in the fibers and slight yellowing of the molded body were observed. Example 5, in which a manifold was not used, exhibited excellent strength, although slight yellowing of the molded body was observed when compared with Example 1, which used a manifold.

Example 7, which used Corson alloy to form the first sections of the die portion, and had the structure where the first section and the second section were separable from each other, was found to achieve higher-cycle molding when compared with Example 8, which used carbon steel to form the first sections, and Example 9, which did not have the separable structure.

On the other hand, Comparative Example 1, where the value of L1/L0 was not greater than 3, exhibited longer cycle time and poorer productivity.

According to the disclosure, molded products having excellent strength, in particular, impact strength can be obtained. For example, using a large-sized high-speed impact compression tester, an impact test was performed on a box-shaped test piece (a box-shaped molded product having dimensions of 150 mm×200 mm with a height of 45 mm, and having a bottom plate with a thickness 3 mm), which was produced using the same materials as those used in Example 1, wherein the box was placed on the test table with the open side of the box facing down, and an energy applied to the bottom plate of the box was set at 250 J. As an object to be dropped to apply the energy of 250 J, a cone having a diameter of 185 mm at the bottom surface thereof was used. In this impact test, an injection-molded product of a composite material of 50% glass short fibers/polyamide 66 having the same shape was not able to maintain the shape and the material thereof was crushed. On the other hand, the molded body made of the same materials as those used in Example 1 maintained the shape and did not break in this impact test, and was able to rebound the dropped substance several times on the bottom plate thereof.

INDUSTRIAL APPLICABILITY

According to the disclosure, a method can be provided, which allows high-cycle compression molding of thermoplastic resin fiber composite molded bodies for which high level mechanical physical properties are required, such as structural parts of various machines and automobiles.

The invention claimed is:

1. A molding die comprising a plurality of die portions that form a cavity in which a molded body is molded, the molding die comprising:
   a first temperature adjusting unit disposed in the vicinity of a cavity surface, the first temperature adjusting unit being capable of at least cooling the cavity surface; and
   a second temperature adjusting unit disposed on a side of the first temperature adjusting unit opposite from the cavity surface, the second temperature adjusting unit being capable of at least heating the cavity surface,
   wherein a distance L0 from the cavity surface to the first temperature adjusting unit and a distance L1 from the cavity surface to a surface of the corresponding die portion opposite from the cavity surface satisfy the following relationship:

$(L1/L0)>3$;

wherein:
   each die portion comprises a first section including the first temperature adjusting unit, and a second section including the second temperature adjusting unit,
   a volume V(I) of the first section of the die portion and a volume V0 of the die portion satisfy the following relationship:

$1.3<(V0/V(I))<3$; and a material forming the first section has a thermal conductivity C(I) (J/s·m·K) that is 3.5 times or more a thermal conductivity C(II) (J/s·m·K) of a material forming the second section, and/or the material forming the first section has a thermal diffusivity (m$^2$/s) that is 3.5 times or more a thermal diffusivity (m$^2$/s) of the material forming the second section.

2. The molding die as claimed in claim 1, wherein a distance L2 from the first temperature adjusting unit to the second temperature adjusting unit satisfies the following relationship:

$L2>L0$.

3. The molding die as claimed in claim 1, wherein a material forming the first section has a thermal conductivity C(I) (J/s·m·K) of 100 J/s·m·K or more.

4. The molding die as claimed in claim 1, wherein a material forming the first section has a hardness HB of 200 or more.

5. The molding die as claimed in claim 4, wherein the material forming the first section has a hardness HB of 250 or more.

6. The molding die as claimed in claim 1, wherein the first section and the second section are able to be spaced apart from each other when cooling of the cavity surface is performed.

7. The molding die as claimed in claim 1, wherein the first temperature adjusting unit comprises a plurality of cooling medium paths through which a cooling medium flows, and at least one manifold configured to let the cooling medium at the same temperature simultaneously flow through the plurality of cooling medium paths.

8. The molding die as claimed in claim 1, comprising a depressurization path configured to reduce pressure in the cavity when the die is fastened.

* * * * *